Sept. 17, 1968    L. A. URBAN    3,401,524
CONTROL FOR DUCTED FAN ENGINE
Filed April 21, 1967    4 Sheets-Sheet 1

COMPRESSOR INLET

COMPRESSOR OUTLET

INVENTOR
LOUIS A. URBAN
BY Norman Friedland
ATTORNEY

United States Patent Office 3,401,524
Patented Sept. 17, 1968

3,401,524
CONTROL FOR DUCTED FAN ENGINE
Louis A. Urban, Granby, Conn., assignor to United Aircraft Corporation, Hartford, Conn., a corporation of Delaware
Filed Apr. 21, 1967, Ser. No. 632,805
12 Claims. (Cl. 60—224)

ABSTRACT OF THE DISCLOSURE

Fan-air flow of a ducted fan turbojet engine is controlled by varying the fan exhaust nozzle as a function of either the ratio of the difference between fan discharge total pressure and compressor inlet total pressure to the difference between fan discharge total pressure and fan discharge static pressure or the ratio of the difference between fan discharge total pressure and compressor inlet total pressure to the difference between fan discharge total pressure and the total pressure in the duct downstream of the duct burner or the reciprocals of these values.

Background of the invention

This invention relates to controls for jet engines and particularly to a control adapted to control the exit area of the bypass in a ducted fan jet type of engine.

As is well known in the art, in supersonic flight, it is desirable to match the compressor weight flow to the weight flow of the inlet of the air ingressing thereto. It is customary to provide bypass doors downstream of the inlet throat to bleed off the excess air not required by the engine. To maximize inlet duct efficiency it is desirable to hold the bypass doors in a predetermined fixed position for a given airplane flight speed. In a ducted fan engine installation it is desirable and in some instances necessary to control the flow discharging from the ducted fan in order to match the engine weight flow to the optimum inlet duct weight flow as power setting or flight speed are varied.

Summary of invention

It is therefore an object of this invention to teach means for controlling the position of the exit nozzles in the duct in a manner to maintain the weight flow through the engine at a constant rate as determined by flight speed and independent of thrust setting.

A still further object of this invention is to provide a control for matching the quantities of engine air to inlet air by scheduling a parameter and closing the loop on the parameter by adjusting the area of exit nozzle.

I have found that I can obtain a scheduling parameter providing sufficient range and sensitivity to permit accurate control of the engine air flow.

The engine variables measured to establish the control parameters are: (1) compressor inlet total pressure-$P_{t2}$, (2) compressor or fan discharge total pressure-$P_{t3}$, and (3) either compressor or fan discharge static pressure as measured by either a static wall tap or a "boosted Pitot" tube-$P_{s3}$, or burner or duct discharge total pressure-$P_{t4}$. These pressures are then computed to an actual $\Delta P/\Delta P$ value and then compared to a desired $\Delta P/\Delta P$ which is scheduled as a function of N and $T_2$. (The definition of $\Delta P/\Delta P$, N and $T_2$ will be defined hereinbelow.)

Other features and advantages will be apparent from the specification and claims and from the accompanying drawings which illustrate an embodiment of the invention.

Descritpion of the preferred embodiment

This invention may best be understood by referring to FIGS. 1-8 generally showing the relationship of the air inlet and engine to the aircraft, the various components of the engine and certain performance characteristics of the engine.

Figure 1:
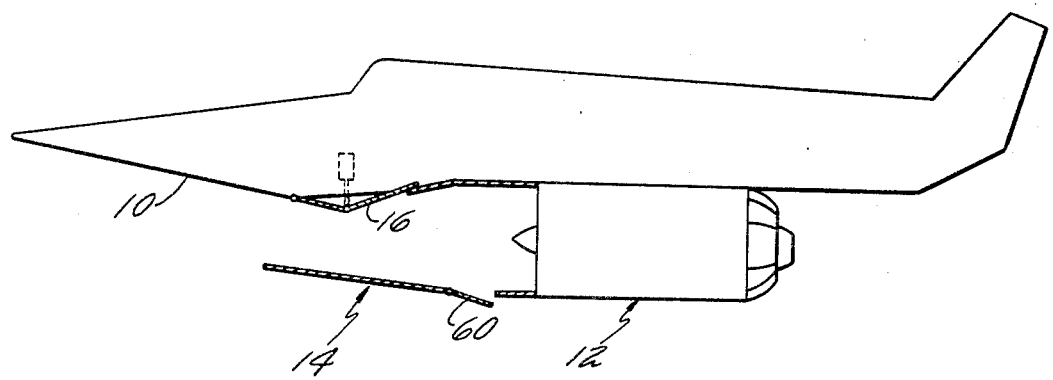
FIGURE 1 is a schematic illustration showing an engine mounted to an aircraft and the inlet to the engine.

As noted from FIG. 1 the aircraft is generally illustrated by reference numeral 10 which has mounted thereon a ducted-fan-turboject engine generally illustrated by numeral 12. Located just upstream of the engine is air inlet 14 having a movable wedge 16 serving to reduce the throat area in order to decelerate the incoming air to a value substantially equal to Mach 1. The air is decelerated still further in the adjacent diffuser section so that it will be subsonic upon entering the compressor and fan.

Figure 2:
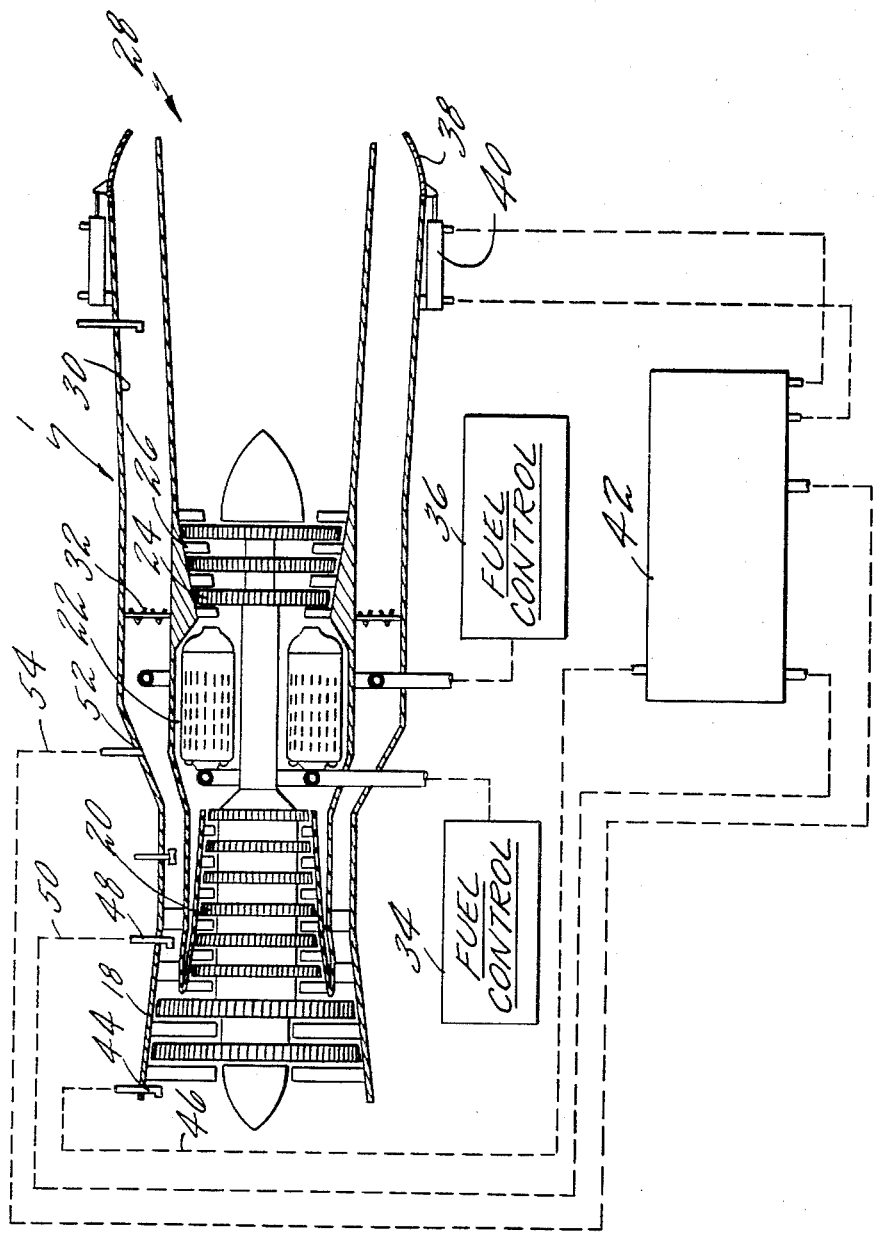
FIGURE 2 is a schematic illustration of the engine.

The type of engine is best illustrated in FIG. 2 as comprising a fan section 18, compressor section 20 (gas generator), burner section 22, turbine 24 driving the power compressor section 20, turbine section 26 driving the fan 18, and exhaust section generally illustrated by numeral 28. The engine includes an annular duct 30 bypassing the main burner and discharging at the exhaust section 28. Burners 32 may be included in the bypass duct 30 for burning fuel therein so as to augment the thrust generated by the primary engine. A suitable fuel control, shown in the blank box 34, serves to control the fuel to the main burner and a suitable fuel control shown in blank box 36 serves to control fuel to the duct burner. Any customary fuel control may be utilized and a suitable type for the main burner may be, for example, the JFC-25 and a suitable control for the duct burner may be, for example, the JFC-27, both manufactured by the Hamilton Standard division of United Aircraft Corporation. As the details of these control elements are not necessary to an understanding of the invention, a detailed description thereof is omitted herein for the sake of convenience and simplicity.

Exhaust nozzle 38 mounted at the discharge end of the duct is controlled by actuator 40 which responds to the nozzle control generally illustrated by numeral 42. The nozzle control 42 receives certain engine operating variables and computes these values to an output signal designed to maintain the weight of the air digested by the engine equal to the optimum weight of air for the aircraft inlet. For this purpose total inlet pressure probe 44, fan total discharge pressure probe 40, and static compressor discharge pressure probe 48 transmit pressure signals to the control via lines 50, 52 and 54 respectively. These signals are then converted into a unique control parameter which is scheduled, in a closed-loop manner, as a function of $N_2/\sqrt{\theta_{t2}}$ and $T_{t2}$, by controlling the area of the exhaust nozzle 38 in a manner to be described hereinbelow. The following symbols are defined as follows:

$N_2/\sqrt{\theta}$ = corrected speed in revolutions per minute (r.p.m.) of gas generator rotor
$T$ = temperature
Subscript $t$ = total
Subscript numeral = engine station According to this invention the unique parameter as mentioned above is computed by sensing these three engine pressures, namely, (1) compressor inlet total pressure, $P_{t2}$, (2) compressor or fan discharge total pressure, $P_{t3}$, and (3) either compressor or fan discharge static pressure, $P_{s3}$, or burner or duct discharge total pressure, $P_{t4}$, to provide signals equal to $$\frac{P_{t3}-P_{t2}}{P_{t3}-P_{s3}}$$

or $$\frac{P_{t3}-P_{t2}}{P_{t3}-P_{t4}}$$

or the reciprocals of these values hereinafter generally referred to as $\Delta P/\Delta P$. Such a scheduling parameter provides sufficient range and sensitivity to permit accurate control of engine thrust and engine air flow.

Figure 3:
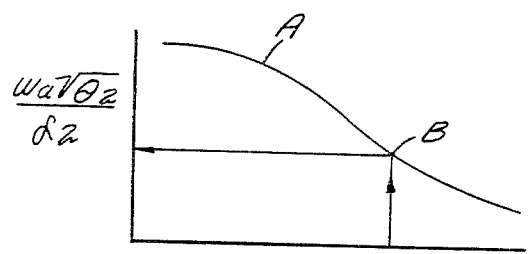
FIGURE 3 is a graph showing a plot of corrected weight flow vs. airplane Mach number.

The uniqueness of this parameter can best be illustrated by referring to FIGS. 3–8 which are graphical illustrations of the performance characteristics of certain components of the jet engine. Looking at the moment at FIG. 3 showing a graphical illustration of a plot of airplane Mach number versus corrected weight flow, it will be appreciated by those skilled in the art that, as indicated by curve A, as airplane Mach number increases the optimum inlet duct corrected weight flow drops off. For illustration purposes, assume that the airplane is operating at Mach 3 as represented by point B. Looking then at the well-known compressor or fan map illustrated in FIG. 4 of the inlet of the compressor or fan which is a plot of the pressure ratio versus corrected weight flow, the family of curves C represent constant fan speed lines, the family of curves D represent constant ducted fan nozzle area lines, and curve E represents the locus of operating points above which surge will occur. For a given engine geometry, that is, where the cross sectional area of the engine is fixed, and where the power of the gas generator is at a fixed operating condition, point B of FIG. 3 will lie at point $B_1$ of FIG. 4. Assuming then that the power changes in a decreased manner, point $B_1$ will move along line D until it reaches a new point $B_2$. At this new point there will be a corresponding corrected air weight flow which is less than the original corrected weight flow. This is undesirable. It is therefore necessary to provide means for maintaining the corrected weight flow at a constant value regardless of how the power requirement from the engine changes. While the weight flow corrections could be handled by varying the area at the inlet, upstream of the engine, namely, by varying the area of the wedge 16 or in the case of a bypass engine by opening and closing the bypass doors generally illustrated by reference numeral 60, this is not desirable once the cruise speed of the aircraft has been selected. It is more desirable to change the exit area nozzles to match the amount of air required by the engine to that which is optimum for the inlet.

Figure 4:
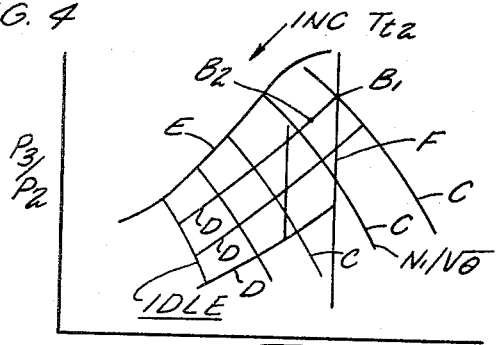
FIGURE 4 is a graph illustrating a customary compressor map at the compressor inlet.
Figure 5:
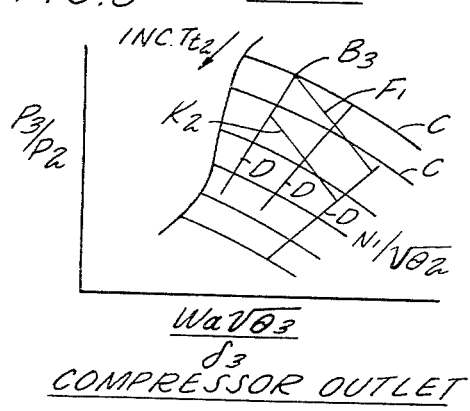
FIGURE 5 is a graph showing a customary compressor map at the compressor discharge.

Looking then at FIG. 5 which shows a compressor map identical to the one in FIG. 4 but showing the characteristics at the discharge end of the compressor or fan, point $B_1$ of FIG. 4 will fall at the point designated point $B_3$. As was mentioned above it is desirable to maintain the corrected weight flow at the inlet of the compressor or fan at a constant value which is represented by the vertical line F in FIG. 4. The flow characteristics at the discharge end to attain line F of FIG. 4 corresponds to curve $F_1$ of FIG. 5 noting that the corrected weight flow at the discharge end varies such that as the pressure ratio of the compressor decreases, the corrected weight flow increases.

Figure 6:
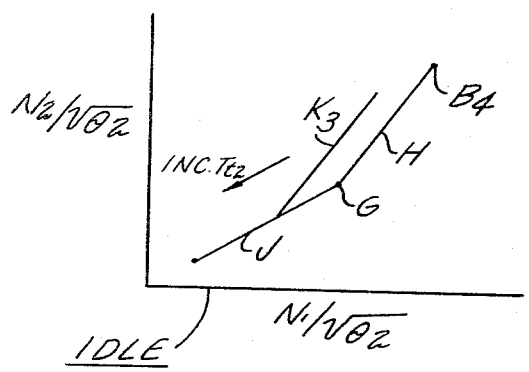
FIGURE 6 is a graph showing a plot of corrected speed of the power generator vs. corrected speed of the fan.

As can be seen from the graph illustrated in FIG. 6 the corrected speed of the fan varies as a function of the corrected speed of the gas generator, that is, $N_1/\sqrt{\theta_2}$ is a function of $N_2/\sqrt{\theta_{t2}}$ and area represented by line D, and to $B_4$ of FIG. 6. Point G represents that point where the nozzles are full open and the line interconnecting G and $B_4$, curve H corresponds to line F of FIG. 4 and represents the full range of opening and closing the nozzles. Curve J shows the speed relationship when the nozzles are in the full open position. Thus, the nozzles remain open until a predetermined speed is maintained and are only closed above this speed.

Figure 7:
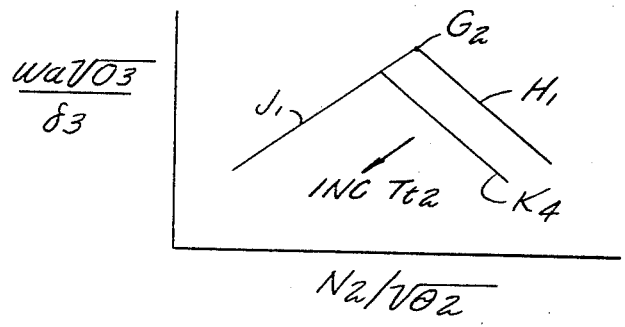
FIGURE 7 is a graph showing a plot of corrected weight flow vs. corrected speed of the power generator.

Curves H and J of FIG. 6 can be replotted against corrected weight flow as shown in FIG. 7 noting that the same curves are represented by the same reference letter with a subscript. It will be appreciated that as corrected speed $(N_2/\sqrt{\theta_2})$ increases and the nozzle area is reduced by closing the nozzles, corrected discharge weight flow decreases along curve $H_1$ which in essence corresponds to curve $F_1$ of FIG. 5.

(1) $$\frac{\Delta P_c}{P_t-P_s}=\frac{P_{t3}-P_{t2}}{P_{t3}-P_{s3}}$$

multiplying the numerator and denominator of the right-hand factor of Equation 1 by $P_{t3}$ gives:

(2) $$\frac{\Delta P_c}{P_t-P_s}=\frac{1-\dfrac{P_{t2}}{P_{t3}}}{1-\dfrac{P_{s3}}{P_{t3}}}$$

multiplying the numerator and denominator of the right-hand factor of Equation 2 by $P_{t3}/P_{t2}$ gives:

(3) $$\frac{\Delta P_c}{P_t-P_s}=\frac{\dfrac{P_{t3}}{P_{t2}}}{\dfrac{P_{t3}}{P_{t2}}\left(1-\dfrac{P_{s3}}{P_{t2}}\right)}$$

as is well known in the art, for gas flow $$\frac{W_a\sqrt{\theta_t}}{\delta_t}$$

is a function of the local cross sectional area and the local static-to-total pressure ratio. Since the cross sectional area at engine station 3 is known and constant, then:

(4) $$\frac{W_a\sqrt{\theta_{t3}}}{\delta_{t3}}=f\left(\frac{P_{s3}}{P_{t3}}\right)$$

or conversely (5) $$\frac{P_{s3}}{P_{t3}}=f\left(\frac{W_a\sqrt{\theta_{t3}}}{\delta_{t3}}\right)$$

From 3 and 5 above, $\Delta P/\Delta P$ is a function of $P_{t3}/P_{t2}$ and $$\frac{W_a\sqrt{\theta_{t3}}}{\delta_{t3}}$$

From FIG. 4, $P_{t3}/P_{t2}$ is a function of $N_1/\sqrt{\theta_{t2}}$ and area represented by line D.

From FIGS. 5 and 7, $$\frac{W_a\sqrt{\theta_{t3}}}{\delta_{t3}}$$

is a function of $N_1/\sqrt{\theta_{t2}}$ and area represented by line D.

From FIG. 6 $N_2/\sqrt{\theta_{t2}}$ is a function of $N_1/\sqrt{\theta_{t2}}$ and area represented by D.

Figure 8:
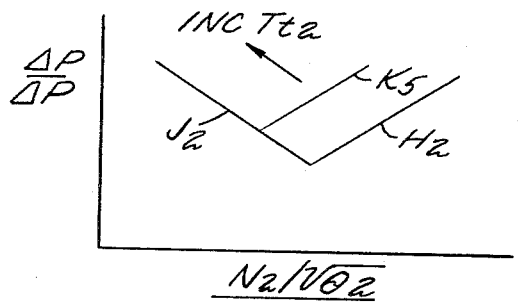
FIGURE 8 is a graph showing a plot of a unique scheduling parameter vs. corrected speed of the power generator.

Therefore $\Delta P/\Delta P$ from the foregoing is obviously a function of $N_2\sqrt{\theta_{t2}}$ and area represented by line D, and FIG. 8 may therefore be substituted for FIG. 7.

Figure 9:
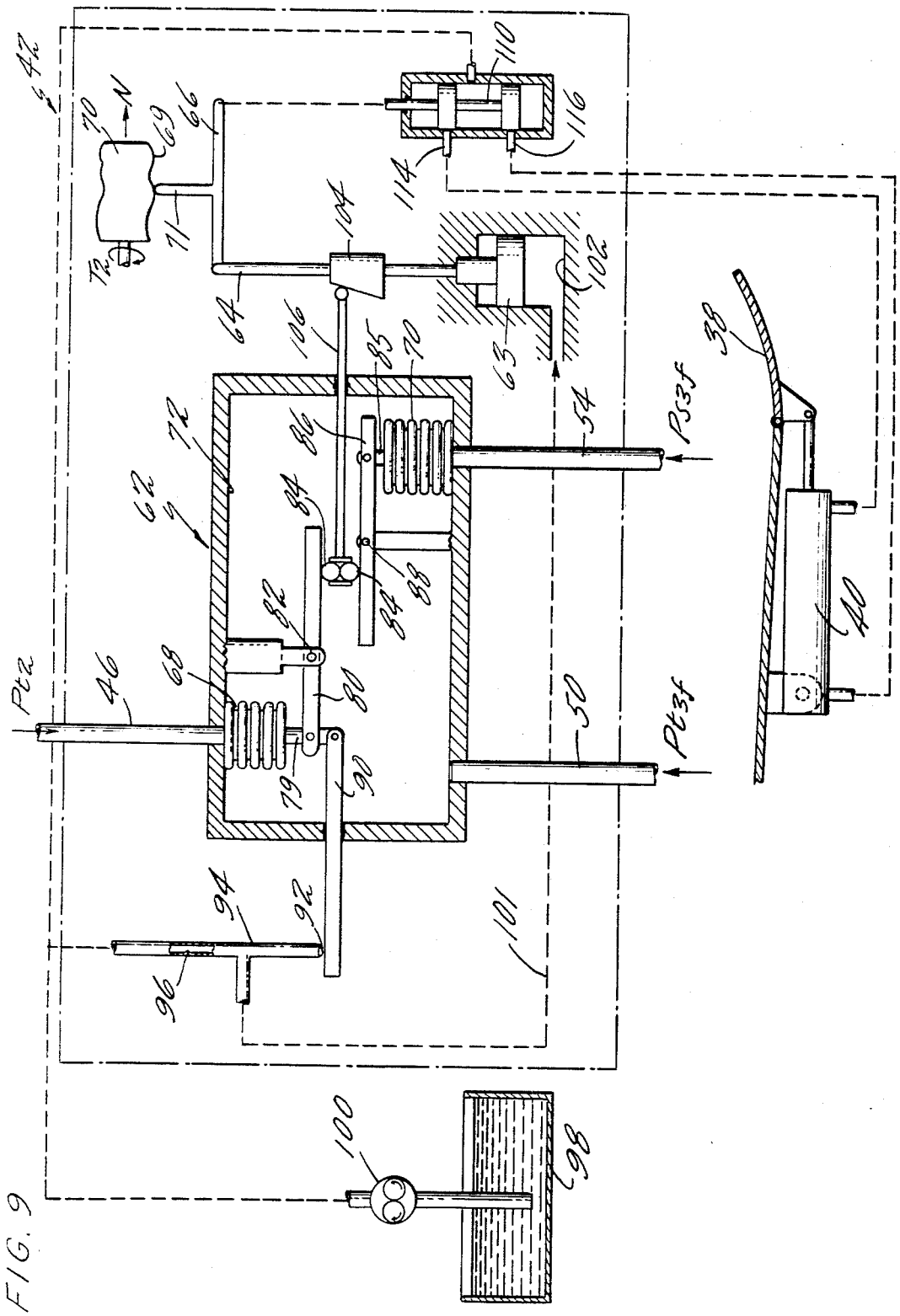
FIGURE 9 is a schematic representation of a preferred embodiment of the invention.

Replotting curve 7 and substituting the unique parameter $\Delta P/\Delta P$ for corrected weight flow it can be seen that similar characteristics are obtained, such that as the nozzles are closed along curve $H_1$, the ratio $\Delta P/\Delta P$ increases as the corrected discharge weight flow (shown in FIG. 7) decreases. It is apparent from the foregoing that this unique control parameter can be scheduled as a function of corrected speed $(N_2/\sqrt{\theta_2})$ to maintain the corrected weight flow at the inlet of the compressor at a constant value by varying the position of the nozzles. Curves K on FIGS. 4 through 8 illustrate the shift of the operating lines as compressor inlet total temperature changes. For this reason means such as a 3-dimensional cam are necessary to reflect these families of curves. Consideration to the simplified theoretical description of the control parameter should facilitate the understanding of this invention which is shown in its preferred embodiment in FIG. 9. While this schematic illustrates the preferred embodiment, it is to be understood that any other well-known devices for measuring the ratio of sensed differential pressures may be employed with equal efficacy.

Control 42 comprises pressure ratio sensor and computer indicated generally by reference numeral 62 which serves to generate a signal indicative of the ratio of the control parameter $\Delta P/\Delta P$. As will be understood by the description to follow, the output of 62 can be seen as the position of servo piston 63 which positions rod 64. The upper end of rod 64 is connected to adding bar 66 which receives a scheduled $\Delta P/\Delta P$ signal defined by the profile 68 of 3-dimensional cam 70 from follower cam 71. As schematically illustrated 3-dimensional cam produces this scheduled $\Delta P/\Delta P$ signal as a function of the speed of the compressor and the temperature at the inlet of the compressor. Three-dimensional cams are well known in the art and for further information regarding the same, reference is hereby made to U.S. Patent No. 2,822,666. The position of output rod 64 is obtained as mentioned above by the ratio computer 62 which includes bellows 68 and bellows 70 responding to the desired pressure signals selected to produce the actual $\Delta P/\Delta P$ ratio signal. To this end, total pressure in line 50 is admitted internally of housing 70 to act on the outside of bellows 68 and 70. Total pressure in line 46 is admitted internally of bellows 68 and static pressure in line 54 is admitted internally of bellows 70. Bellows 68 produces a signal indicative of the difference between the total pressure at the inlet of the fan and the total pressure at the discharge end of the fan and bellows 70 produces a signal indicative of the difference between the static pressure at the discharge end of the fan and the total pressure at the discharge end of the fan. Bellows 68 carries rod 79 which, in turn, is connected to one end of fulcrumed lever 80 which is pivotally connected to pivot 82. The other end of fulcrumed lever bears against rollers 84. Bellows 70 carries rod 85 which is connected to one end of fulcrumed lever 86 pivotally connected to pivot 88. The other end of fulcrumed lever 86 bears against rollers 84. Obviously, the summation of these signals that are produced by bellows 68 and 70, in turn, is transmitted through pivotable lever 90 to position it relative to the end of jet nozzle 92 which is attached to the end of jet pipe 94. This serves to adjust the curtain area of jet pipe 92 to control the pressure drop across fixed restriction 96. Pressurized fluid is admitted thereto from the reservoir 98 by virtue of pump 100 schematically illustrated. The controlled pressure is in turn transmitted through line 101 to chamber 102 to act on piston 63.

It is apparent from the foregoing that the input signal transmitted through level 90 establishes an area relative to the jet pipe nozzle 92 for positioning piston 63. Feedback is effected by cam 104 and plunger 106 which carries rollers 84. The repositioning of rollers 84 effectively changes the moment arm of levers 86 and 80 in such a manner that when the forces produced by bellows 68 and 70 are balanced, the curtain area of jet nozzle 92 will resume to its null position and the new established position of piston 63 will be indicative of the ratio of the signals sensed by the bellows, i.e., $\Delta P/\Delta P$.

This signal is then applied to adding bar 66 via rod 64 where it is compared to the scheduled $\Delta P/\Delta P$ signal. The adding bar will in turn position pilot valve 110. In the event there is a discrepancy between the actual $\Delta P/\Delta P$ signal and desired $\Delta P/\Delta P$, spool valve 112 opens and closes ports 114 and 116 for admitting high pressure to or draining pressure from actuator 40. As the actual $\Delta P/\Delta P$ ratio signal increases, the actuator is actuated to move nozzles 38 in the opened position.

What I claim as new and desire to secure by Letters Patent of the United States is:

1. A control for matching the engine air of a turbojet engine having a compressor and bypass duct to the air ingested at the inlet upstream of the engine comprising,
    an exit variable area nozzle at the exit end of the bypass duct,
    actuator means for positioning said exit variable area nozzle,
    and control means responsive to the difference of a scheduled ratio of the difference between compressor discharge total pressure and compressor inlet total pressure to the difference between compressor discharge total pressure and compressor discharge static pressure and the actual ratio of the difference of compressor dicharge total pressure and compressor inlet total pressure to the difference between compressor discharge total pressure and compressor discharge static pressure for controlling said actuator means.

2. A control for matching the engine air of a turbojet engine having a compressor and bypass duct to the air ingested at the inlet upstream of the engine comprising,
    an exit variable area nozzle at the exit end of the bypass duct,
    actuator means for positioning said exit variable area nozzle,
    and control means responsive to the difference of a scheduled ratio of the difference between compressor discharge total pressure and compressor discharge static pressure to the difference between compressor discharge total pressure and compressor inlet total pressure and the actual ratio of the difference of compressor discharge total pressure and compressor discharge static pressure to the difference between compressor discharge total pressure and compressor inlet total pressure for controlling said actuator means.

3. A control for matching the engine air of a turbojet engine having a fan, a compressor and bypass duct to the air ingested at the inlet upstream of the engine comprising,
    an exit variable area nozzle at the exit end of the bypass duct,
    actuator means for positioning said exit variable area nozzle,
    and control means responsive to the difference of a scheduled ratio of the difference between fan discharge total pressure and compressor inlet total pressure to the difference between fan discharge total pressure and compressor fan static pressure and the actual ratio of the difference of fan discharge total pressure and compressor inlet total pressure to the difference between compressor fan total pressure and compressor fan static pressure for controlling said actuator means.

4. A control for matching the engine air of a turbojet engine having a compressor and bypass duct to the air ingested at the inlet upstream of the engine comprising,
an exit variable area nozzle at the exit end of the bypass duct,
actuator means for positioning said exit variable area nozzle,
and control means responsive to the difference of a scheduled ratio of the difference between compressor discharge total pressure and compressor inlet total pressure to the difference between compressor discharge total pressure and bypass duct discharge static pressure and the actual ratio of the difference of compressor discharge total pressure and compressor inlet total pressure to the difference between compressor discharge total pressure and bypass duct discharge static pressure for controlling said actuator means.

5. A control for matching the engine air of a turbojet engine having a compressor and bypass duct to the air ingested at the inlet upstream of engine comprising,
means responsive to compressor speed and compressor inlet temperature for scheduling a desired signal,
means responsive to compressor inlet total pressure ($P_{t2}$), compressor discharge total pressure ($P_{t3}$), compressor discharge static pressure ($P_{s3}$), for establishing an actual signal in accordance with the formula:

$$\frac{P_{t3}-P_{t2}}{P_{t3}-P_{s3}}$$

variable area exit duct and actuator means for controlling the area thereof,
means responsive to the differences between said desired signal and said actual signal for controlling said actuator means.

6. A control for matching the engine air of a turbojet engine having a compressor and bypass duct to the air ingested at the inlet upstream of engine comprising,
means responsive to compressor speed and compressor inlet temperature for scheduling a desired signal,
means responsive to compressor inlet total pressure ($P_{t2}$), compressor discharge total pressure ($P_{t3}$), compressor discharge static pressure ($P_{s3}$), for establishing an actual signal in accordance with the formula:

$$\frac{P_{t3}-P_{s3}}{P_{t3}-P_{t2}}$$

variable area exit duct and actuator means for controlling the area thereof,
means responsive to the differences between said desired signal and said actual signal for controlling said actuator means.

7. A control for matching the engine air of a turbojet engine having a compressor, bypass duct and a burner in the duct to the air ingested at the inlet upstream of engine comprising,
means responsive to compressor speed and compressor inlet temperature for scheduling a desired signal,
means responsive to compressor inlet total pressure ($P_{t2}$), compressor discharge total pressure ($P_{t3}$), duct burner total pressure ($P_{t4}$), for establishing an actual signal in accordance with the formula:

$$\frac{P_{t3}-P_{t2}}{P_{t3}-P_{t4}}$$

variable area exit duct and actuator means for controlling the area thereof,
means responsive to the differences between said desired signal and said actual signal for controlling said actuator means.

8. A control for matching the engine air of a turbojet engine having a compressor, bypass duct and a burner in the duct to the air ingested at the inlet upstream of engine comprising,
means responsive to compressor speed and compressor inlet temperature for scheduling a desired signal,
means responsive to compressor inlet total pressure ($P_{t2}$), compressor discharge total pressure ($P_{t3}$), duct burner total pressure ($P_{t4}$), for establishing an actual signal in accordance with the formula:

$$\frac{P_{t3}-P_{t4}}{P_{t3}-P_{t2}}$$

variable area exit duct and actuator means for controlling the area thereof,
means responsive to the differences between said desired signal and said actual signal for controlling said actuator means.

9. A control for matching the engine air of a turbojet engine having a compressor, a fan and bypass duct to the air ingested at the inlet upstream of engine comprising,
means responsive to compressor speed and compressor inlet temperature for scheduling a desired signal,
means responsive to compressor inlet total pressure ($P_{t2}$), fan discharge total pressure ($P_{t3}$), fan discharge static pressure ($P_{s3}$), for establishing an actual signal in accordance with the formula:

$$\frac{P_{t3}-P_{t2}}{P_{t3}-P_{s3}}$$

variable area exit duct and actuator means for controlling the area thereof,
means responsive to the differences between said desired signal and said actual signal for controlling said actuator means.

10. A control for matching the engine air of a turbojet engine having a compressor, a fan and bypass duct to the air ingested at the inlet upstream of engine comprising,
means responsive to compressor speed and compressor inlet temperature for scheduling a desired signal,
means responsive to compressor inlet total pressure ($P_{t2}$), fan discharge total pressure ($P_{t3}$), fan discharge static pressure ($P_{s3}$), for establishing an actual signal in accordance with the formula:

$$\frac{P_{t3}-P_{s3}}{P_{t3}-P_{t2}}$$

variable area exit duct and actuator means for controlling the area thereof,
means responsive to the differences between said desired signal and said actual signal for controlling said actuator means.

11. A control for matching the engine air of a turbojet engine having a compressor, a fan and bypass duct to the air ingested at the inlet upstream of engine comprising,
means responsive to compressor speed and compressor inlet temperature for scheduling a desired signal,
means responsive to compressor inlet total pressure ($P_{t2}$), fan discharge total pressure ($P_{t3}$), bypass duct discharge total pressure ($P_{t4}$), for establishing an actual signal in accordance with the formula:

$$\frac{P_{t3}-P_{t2}}{P_{t3}-P_{t4}}$$

variable area exit duct and actuator means for controlling the area thereof,
means responsive to the differences between said desired signal and said actual signal for controlling said actuator means.

12. A control for matching the engine air of a turbojet engine having a compressor, a fan and bypass duct to the air ingested at the inlet upstream of engine comprising,
means responsive to compressor speed and compressor inlet temperature for scheduling a desired signal,
means responsive to compressor inlet total pressure ($P_{t2}$), fan discharge total pressure ($P_{t3}$), bypass duct discharge total pressure ($P_{t4}$), for establishing an actual signal in accordance with the formula:

$$\frac{P_{t3}-P_{t4}}{P_{t3}-P_{t2}}$$

variable area exit duct and actuator means for controlling the area thereof, means responsive to the differences between said desired signal and said actual signal for controlling said actuator means.

References Cited
UNITED STATES PATENTS

| | | | |
|---|---|---|---|
| 2,672,726 | 3/1954 | Wolf | 60—226 |
| 2,873,576 | 2/1959 | Lombard | 60—239 |
| 3,060,680 | 10/1960 | Wilde | 60—242 |
| 3,269,114 | 8/1966 | Marchant | 60—226 |
| 3,298,180 | 1/1967 | Trinkler | 60—239 |

MARTIN P. SCHWADRON, *Primary Examiner.*

DOUGLAS HART, *Assistant Examiner.*